(12) United States Patent
Phillips et al.

(10) Patent No.: US 12,227,036 B2
(45) Date of Patent: Feb. 18, 2025

(54) VEHICLE TIRE PRESSURE ALERT SYSTEM FOR PAVED ROAD AND OFF-ROAD DRIVING CONDITIONS

(71) Applicant: Nissan North America, Inc., Franklin, TN (US)

(72) Inventors: Carl Phillips, Franklin, TN (US); Melaina Vasko, Highland Township, MI (US); Kurt Rosolowsky, Royal Oak, MI (US)

(73) Assignee: Nissan North America, Inc., Franklin, TN (US)

( * ) Notice: Subject to any disclaimer, the term of this patent is extended or adjusted under 35 U.S.C. 154(b) by 1040 days.

(21) Appl. No.: 17/256,986

(22) PCT Filed: Jul. 19, 2018

(86) PCT No.: PCT/US2018/042803
§ 371 (c)(1),
(2) Date: Dec. 29, 2020

(87) PCT Pub. No.: WO2020/018097
PCT Pub. Date: Jan. 23, 2020

(65) Prior Publication Data
US 2021/0138850 A1 May 13, 2021

(51) Int. Cl.
*B60C 23/04* (2006.01)

(52) U.S. Cl.
CPC ...... *B60C 23/0406* (2013.01); *B60C 23/0479* (2013.01); *B60C 23/0484* (2013.01)

(58) Field of Classification Search
None
See application file for complete search history.

(56) References Cited

U.S. PATENT DOCUMENTS 6,594,566 B1 7/2003 Skoff
2004/0049329 A1* 3/2004 Yamamoto .......... B60C 23/0479
340/442

(Continued)

FOREIGN PATENT DOCUMENTS

FR  2943277 A1  9/2010
JP  2003170714 A  6/2003

(Continued)

OTHER PUBLICATIONS

Wikipedia, Off-Roading, Jun. 25, 2018, all. (Year: 2018).*

(Continued)

*Primary Examiner* — James J Lee
*Assistant Examiner* — Tawri M McAndrews
(74) *Attorney, Agent, or Firm* — Global IP Counselors, LLP

(57) ABSTRACT

A tire pressure monitoring system includes tire pressure sensors installed within vehicle tires, a receiver, an alerting device, an electronic input/output device and an electronic controller. The receiver receives tire pressure signals from the tire pressure sensors, The electronic input/output device provides manual input of instruction and data. The electronic controller is configured to monitor tire pressure and in response to tire pressure in each of vehicle tires achieving a change from a first preset tire pressure to a second preset tire pressure the alerting device is operated to alert a person changing the tire pressure that the change has been achieved. The first preset tire pressure corresponds to paved road driving conditions and the second preset tire pressure corresponds to off-road driving conditions.

20 Claims, 10 Drawing Sheets

(56) References Cited

U.S. PATENT DOCUMENTS

| | | |
|---|---|---|
| 2005/0160805 A1 | 7/2005 | Taki |
| 2010/0117816 A1 | 5/2010 | Okada |
| 2010/0207753 A1 | 8/2010 | Sugiura |
| 2011/0025487 A1 | 2/2011 | Laird et al. |
| 2015/0174972 A1 | 6/2015 | Zhou et al. |
| 2016/0121666 A1* | 5/2016 | Chan ................ B60C 23/20 137/78.1 |
| 2018/0178598 A1* | 6/2018 | Woodley ............. G07C 5/006 |

FOREIGN PATENT DOCUMENTS

| | | | |
|---|---|---|---|
| JP | 2004284529 A | 10/2004 | |
| JP | 2004338594 A | 12/2004 | |
| JP | 2005186659 A | 7/2005 | |
| JP | 2005206073 A | 8/2005 | |
| JP | 2005212514 A | 8/2005 | |
| JP | 2005212620 A | 8/2005 | |
| JP | 2008018937 A | 1/2008 | |
| JP | 2010112931 A | 5/2010 | |
| JP | 2010188784 A | 9/2010 | |
| JP | 2012218583 A | 11/2012 | |
| JP | 2017206140 A | 11/2017 | |

OTHER PUBLICATIONS

International Search Report in PCT/US2018/042803 dated Oct. 1, 2018.
Written Opinion, mailed on Oct. 1, 2018.
The Communication Pursuant to Rules 161(2) and 162 EPC mailed on Jan. 29, 2021.

* cited by examiner

VEHICLE TIRE PRESSURE ALERT SYSTEM FOR PAVED ROAD AND OFF-ROAD DRIVING CONDITIONS

CROSS-REFERENCE TO RELATED APPLICATIONS

This application is a U.S. National Stage application of International Application No. PCT/US2018/042803, filed Jul. 19, 2018, the contents of each of which are hereby incorporated herein by reference.

BACKGROUND

Field of the Invention

The present invention generally relates to vehicle tire pressure monitoring system that monitors air pressure within vehicle tires. More specifically, the present invention relates to vehicle tire monitoring system that provides alerts to a vehicle operator or attendant manually inflating or deflating tire pressure when the tire pressure reaches a desired level.

Background Information

Airing-down tires is a common practice among off-roaders to maximize traction in sand, rocks and other terrain. Doing so creates larger tire contact patch for increased traction and allows tires to better conform to the shapes of obstacles, enhancing traction. The typical approach is to use a tire pressure gauge to check pressures while deflating or to attach an aftermarket product to tire valve stems, either of which is time consuming and tedious.

SUMMARY

One object of the present disclosure is to provide a vehicle operator or attendant with an alert when desired air pressure has been manually achieved.

Another object of the present disclosure is to configure a tire pressure monitoring system with memory that stores a first preset tire pressure corresponding to on-road driving conditions and a second preset tire pressure corresponding to off-road driving conditions, and, provide a vehicle operator or attendant manually inflating or deflating the tires with an alert in response achieving a desired one of the first and second preset tire pressures.

In view of the state of the known technology, one aspect of the present disclosure is to provide a tire pressure monitoring system with a vehicle body structure, a plurality of wheels, a receiver, an alerting device, an electronic input/output device and an electronic controller. The plurality of wheels are rotatably mounted to the vehicle body structure. Each wheel has a tire pressure sensor installed therein. The receiver is configured to receive tire pressure signals from each of the tire pressure sensors. The electronic input/output device is configured to receive manually input instructions. The electronic controller has electronic memory and is electronically connected to the receiver, the alerting device and the electronic input/output device. A first preset tire pressure and a second preset tire pressure for each of the plurality of wheels is stored in the electronic memory. The first preset tire pressure is each wheel in paved road driving conditions and. the second preset tire pressure is for each wheel in off-road driving conditions. The electronic controller is configured to monitor tire pressure and in response to determining one-by-one that the change in tire pressure in each of the plurality of wheels from the first preset tire pressure to the second preset tire pressure has been achieved, the electronic controller for each of the plurality of wheels operates the alerting device to alert a person manually changing the tire pressure that the change to the second preset tire pressure in tire pressure has been achieved.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
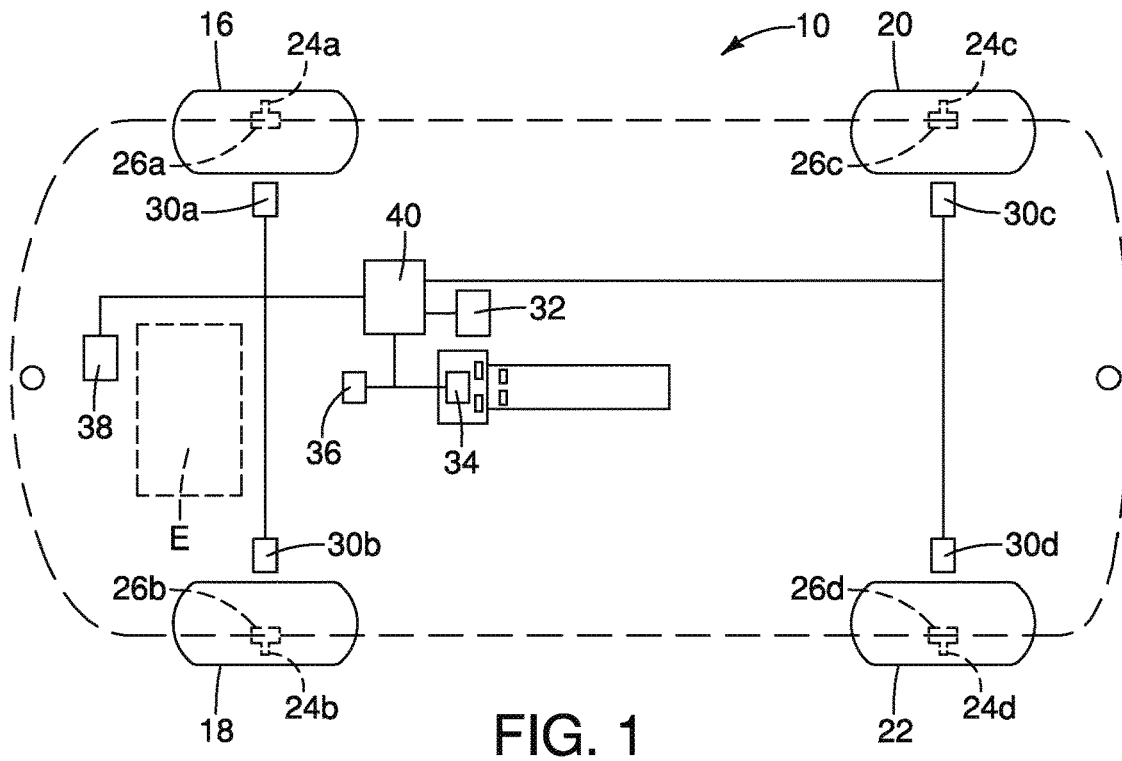
FIG. 1 is a schematic view of a vehicle with a vehicle body structure, tires and a tire monitoring system in accordance with one embodiment.

Referring initially to FIG. 1, a vehicle 10 with a tire pressure monitoring system 12 is schematically illustrated in accordance with a first embodiment.

The vehicle 10 includes a vehicle body structure 14 shown schematically in FIG. 1. Various portions of the tire pressure monitoring system 12 are installed to locations within or on the vehicle body structure 14, as described further below. The vehicle 10 includes four tires 16, 18, 20 and 22 that are rotatably attached to the vehicle body structure 14 in a conventional manner.

Further, the vehicle 10 further includes power plant E operated by a vehicle operator. The power plant E provides rotary power to at least two of the four tires in a conventional manner. It should be understood from the drawings and the description herein that the vehicle 10 further includes many structural components and vehicle systems that are conventional features, structures and systems. Since these features, structures and systems are conventional, further description is omitted for the sake of brevity.

The tire 16 includes a valve stem 24a, as is described in greater detail below. Each wheel includes a valve stem, such as the valve stems 24b, 24c and 24d shown in FIGS. 1 and 3. Further, each of the valve stems 24a, 24b, 24c and 24d has a corresponding tire pressure sensor 26a (tire 16), 26b (tire 18), 26c (tire 20) and 26d (tire 22) installed respectively to the tires 16, 18, 20 and 22, for rotation therewith. Since the four tires 16, 18, 20 and 22 are basically the same, the valve stems 24a, 24b, 24c and 24d are basically the same and the tire pressure sensors 26a, 26b, 26c and 26d are all generally the same, description of only one tire 16, one valve stem 24a and one tire pressure sensor 26a is provided below. Each of the valve stems 24a-24d has a first end located outside the tire and a second end located inside the tire. The corresponding one of the tire pressure sensors 26a-26d is located at the second end of the valve stem within the tire.

It should be understood that description of one of the tires, one of the valve stems and corresponding tire pressure sensor, applies equally to all four tires, valve stems and corresponding tire pressure sensors.

Figure 2:
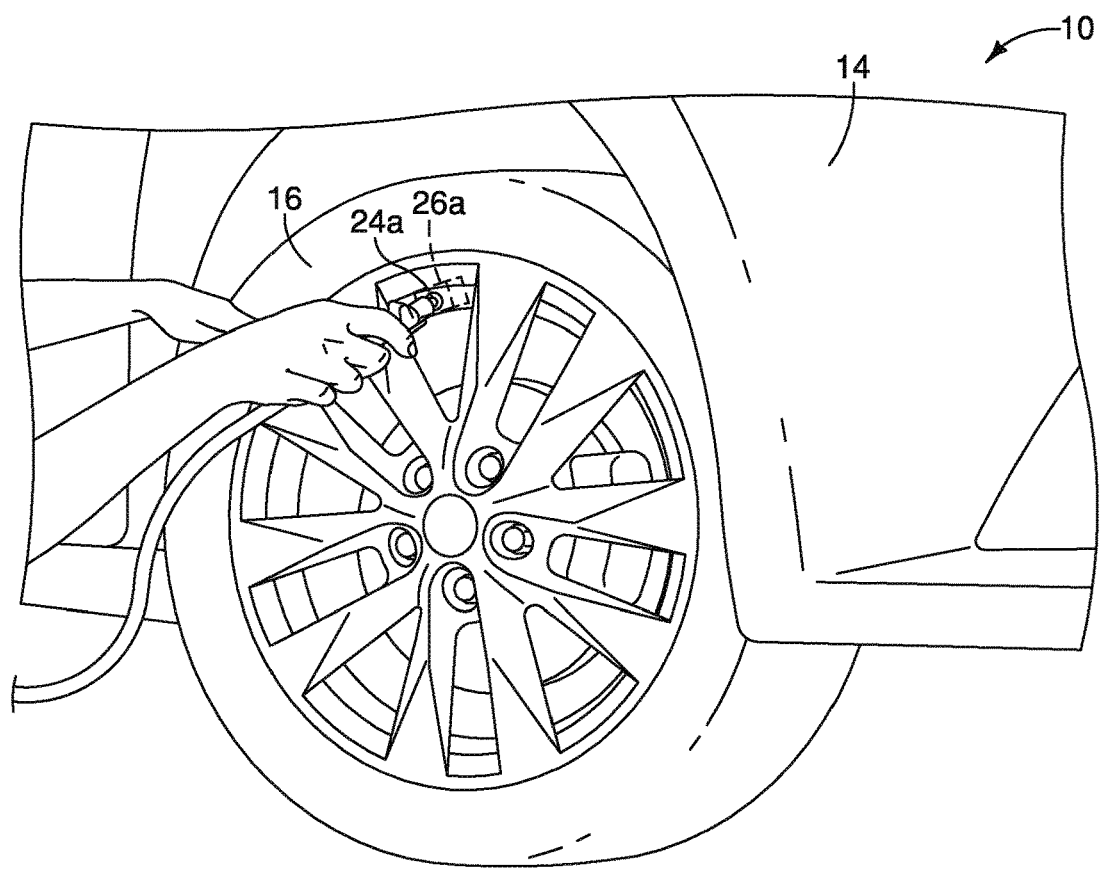
FIG. 2 is a perspective view of the front right side of the vehicle, showing a person deflating or inflating one of the tires in accordance with the one embodiment.
Figure 3:
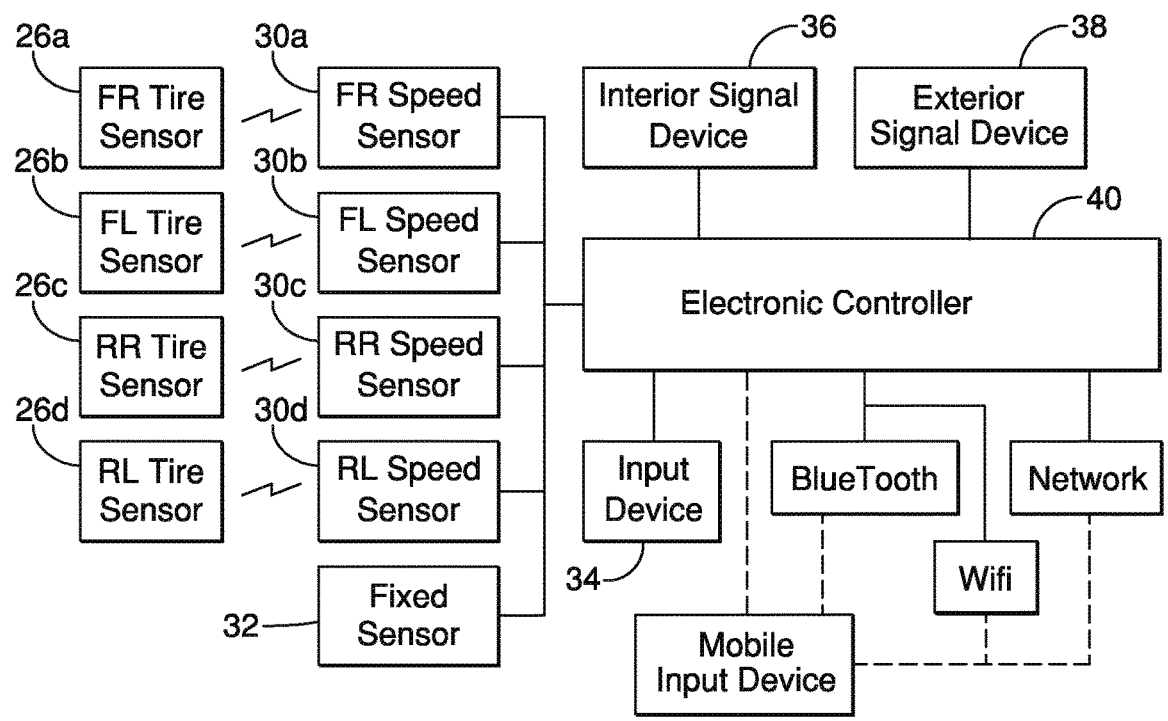
FIG. 3 is a block diagram showing the various elements of the tire monitoring system in accordance with the one embodiment.

A description of the tire pressure monitoring system 12 is now provided with initial reference to FIGS. 1-3. The tire pressure monitoring system 12 can include a plurality of rotation sensors 30a, 30b, 30c and 30d (also referred to as speed sensors), one for each of the wheels 16, 18, 20 and 22. The tire pressure monitoring system 12 further includes a receiver 32, an input device 34, an interior signaling device 36, an exterior signaling device 38 and an electronic controller 40.

There are four rotation sensors 30a, 30b, 30c and 30d, one for each tire. Since basic operation and function of each the rotation sensors 30a, 30b, 30c and 30d are identical, only one rotation sensor 30a is described herein below for the sake of brevity. It should be understood from the drawings and the description herein that the description of one rotation sensor applies equally to all of the rotation sensors.

The rotation sensor 30a adjacent to the tire 16 is configured to detect movement (rotation) of the tire 16. Specifically, the rotation sensor 30a produces rotation data that corresponds to rotation of the tire 16 and position of the valve stem 24a of the tire 16. The rotation sensor 30a can be any of a variety of sensors. For example, in the depicted embodiment, the rotation sensor 30a is part of an anti-lock brake system (not shown) that monitors the rotational speed of each of the four tires via the rotation sensors 30a. A portion of a brake rotor (not shown) of each axle/wheel assembly, or an attachment to the brake rotor, includes a plurality of metallic protrusions (not shown) circumferentially arranged on thereon. Rotational movement of the metallic protrusions with the tire 16 move in proximity to the rotation sensor 30a. As each of the metallic protrusions passes by the rotation sensor 30a, a magnetic field generated by the rotation sensor 30a is disturbed. The magnetic field disturbances produce signals that form the basis for determination of speed of the tire 16.

In an alternative embodiment, the rotation sensor 30a can also receive radio signals from the tire pressure sensor 26a associated with its corresponding valve stein 24. The rotation sensor 30a can also be configured to receive tire identifying signals generated by the tire pressure sensor 26a, where each of the tire pressure sensors 26a, 26b, 26c and 26d produces a unique identifying signal along with a measurement of tire pressure for that tire such that the signal is correlated with the corresponding one of the tires 16, 18, 20 or 22, However, in the depicted embodiment, the receiver 32 is radio signal receiver that receives the tire air pressure measurements and tire identification signals from each of the tire pressure sensors 26a, 26b, 26c and 26d. Thus, when the receiver 32 receives air pressure measurements from one of the tires, the receiver 32 also receives tire identification signals associated with the air pressure measurement. Thus, each tire pressure measurement is identified with a specific tire and its location.

The input device 34 (also referred to as the electronic input/output device 34) can be any of a variety of vehicle devices, such as a display with associated buttons and/or switches that allow selection from various menus displayed therein, or the input device 34 can be a touch screen display such that a vehicle operator can touch items on a displayed menu and make a selection with the touch of a finger. The input device 34 is configured to display or otherwise indicate various vehicle condition related information and data, such as an indicate tire pressure of each of the tires 16. 18, 20 and 22. The input device 34 can also receive various a request to notify the vehicle operator when the valve stem 24a is in a predetermined angular orientation.

The interior signaling device 36 is a device installed within a passenger compartment of the vehicle 10 that is operated to provide various signals to the vehicle operator, as described in greater detail below. The interior signaling device 36 can be a lamp on the instrument panel of the vehicle 10, a buzzer, bell and/or chime, or can be a haptic device that, for example, causes the steering wheel (not shown) or front seat to vibrate. Further, the input device 34 can display a message, thereby serving as a signaling device. In other words, the alerting devices 36 and 38 can be one or more of the following types of devices: a haptic device, a lighting device and an audio device (sound producing device). The haptic device is any one of the following devices: a keyfob and a mobile phone. The lighting device is any one of the following devices installed to the vehicle body structure or electronically linked to the electronic controller: a turn signal lamp, a headlamp, a mobile phone and an LED (light emitting diode). The audio device is one or more of the following devices: a vehicle horn, an entertainment system within the vehicle body structure, a mobile phone and an alarm device installed within the vehicle body structure.

Figure 4:
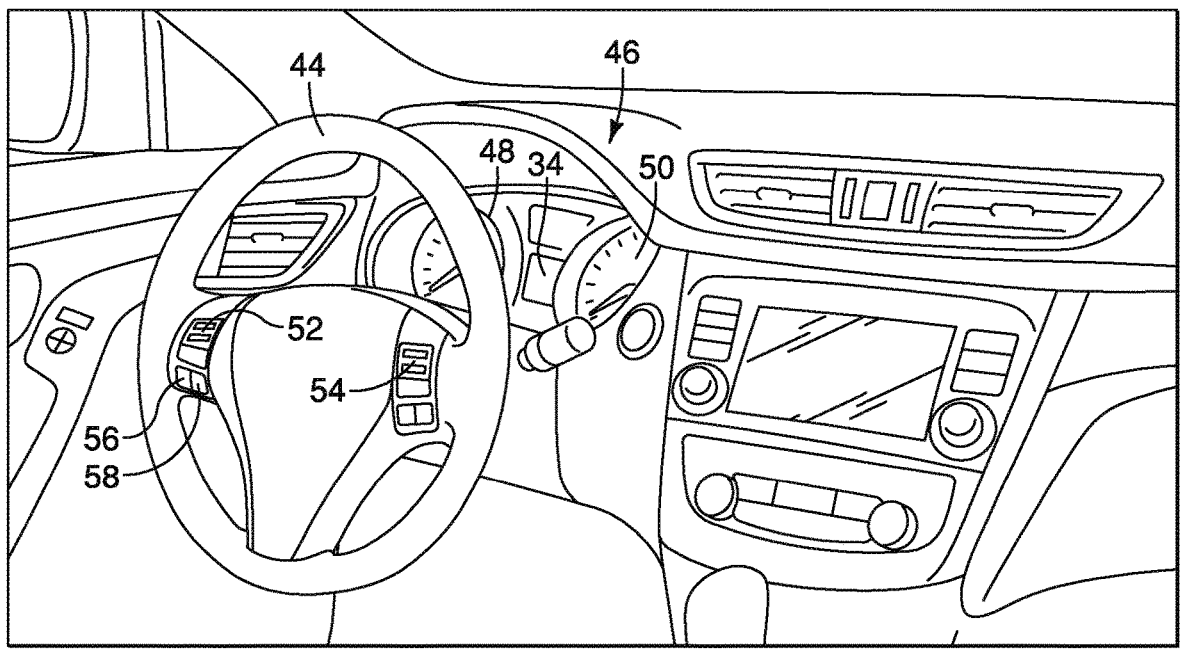
FIG. 4 is a perspective view of an interior of a passenger compartment of the vehicle showing an input device configure to enter data in accordance with the one embodiment.

In the depicted embodiment, the input device 34 is shown in FIG. 4. Specifically, FIG. 4 shows an instrument panel 42 and steering wheel 44 within a passenger compartment of the vehicle 10. The instrument panel 42 includes an instrument cluster 46 having a tachometer 48, a speedometer 50 and the input device 34 therebetween. The input device 34 is a display screen that is operated by the electronic controller 40 to display menus. The display screen can be a touch screen display. However, in the depicted embodiment, the menus displayed on the input device 34 are changed via switches 52 and 54, and buttons 56 and 58 on the steering wheel 44. One of the switches 52 and 54 can be operated to toggle between menus, and the other of the switches 52 and 54 can be used to change selections and/or change values displayed on the input device 34. The buttons 56 and 58 can be used to select entries, data and/or instructions displayed on the input device 34.

The exterior signaling device 38 can be the headlights of the vehicle 10, a horn or other noise making device.

The electronic controller 40 preferably includes a microcomputer with a tire pressure monitoring system (tire monitoring system 12) control program that controls the tire monitoring system 12 as discussed below. The electronic controller 40 can also include other conventional components such as an input interface circuit, an output interface circuit, and storage devices such as a ROM (Read Only Memory) device and a RAM (Random Access Memory) device and electronic storage devices ore drives (all hereinafter referred to collectively as electronic memory). The microcomputer of the electronic controller 40 is programmed to control the tire monitoring system 12. The memory circuit stores processing results and control programs such as ones for the tire monitoring system 12 operations that are run by the processor circuit. The electronic controller 40 is operatively coupled to the various vehicle components and components of the tire monitoring system 12 in a conventional manner. The internal RAM of the electronic controller 40 stores statuses of operational flags and various control data. The internal ROM of the electronic controller 40 stores data communication protocols and commands for various operations. The electronic controller 40 is capable of selectively controlling any of the components of the control system of the tire monitoring system 12 in accordance with the control program. It will be apparent to those skilled in the art from this disclosure that the precise structure and algorithms for the electronic controller 40 can he any combination of hardware and software that will carry out the functions of the tire monitoring system 12.

The electronic controller 40 installed within the vehicle body structure 14 and is in electronic communication with the electronic memory, the rotation sensors 30a-30d, the receiver 32, the input device 34 and the signaling devices 36 and 38 (aka alerting devices 36 and 38). The electronic memory of the electronic controller 40 stores a first preset tire pressure and a second preset tire pressure for each of the plurality of wheels (tires 16. 18, 20 and 22). The first preset tire pressure is intended for use for paved road driving conditions and the second preset tire pressure intended for use for off-road driving conditions. The electronic controller 40 is configured to perform a plurality of tasks and operations, such as those described below.

The electronic controller 40 is configured to monitor air pressure in each of the tires 16, 18, 20 and 22 while the vehicle 10 is operating. The electronic controller 40 also monitors inputs, instructions and/or selections made using the input device 34. For example, several screen shots displayed by the input device 34 are depicted in FIGS. 5-17.

Figure 5:
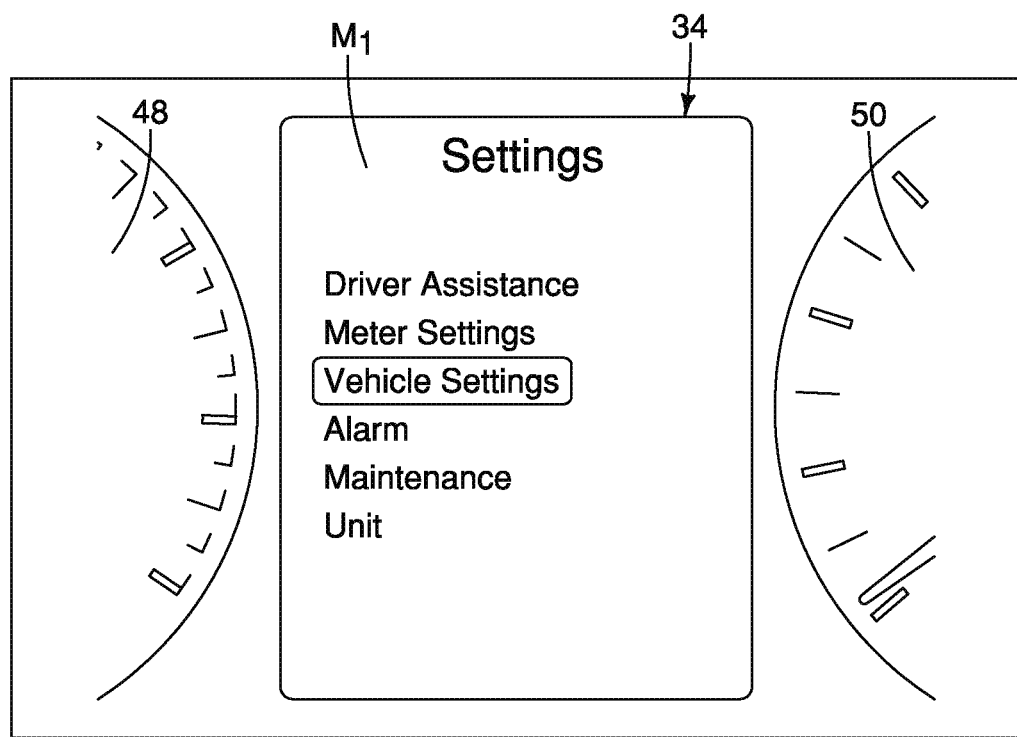
FIG. 5 is a first menu displayed by the input device for use by a vehicle operator in accordance with the one embodiment.
Figure 6:
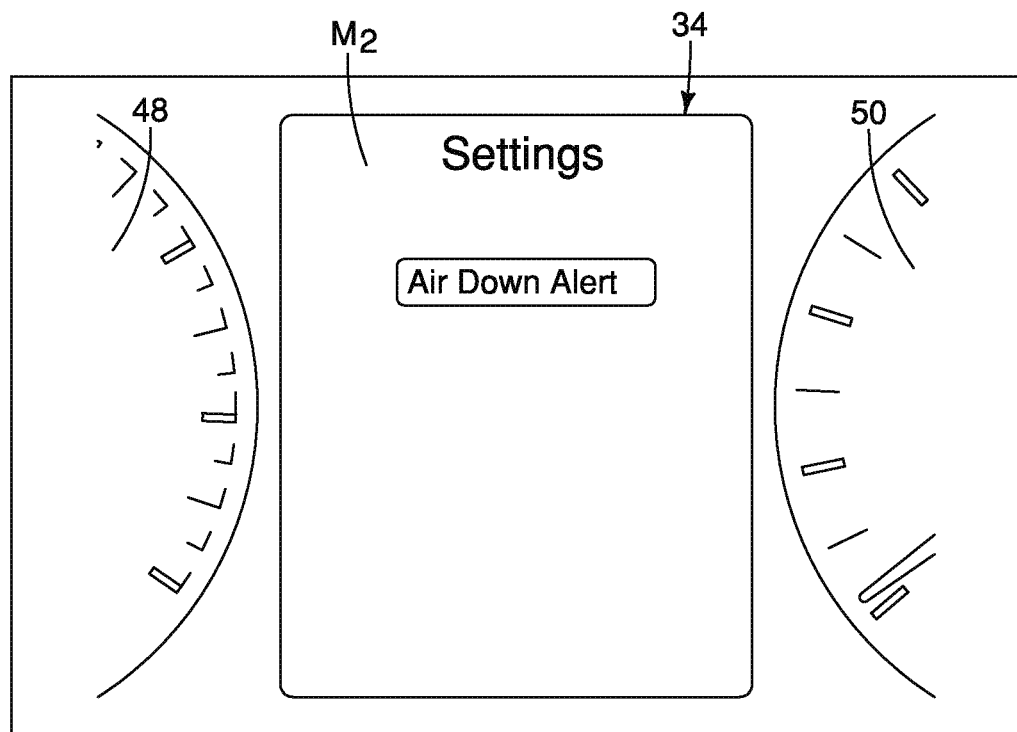
FIG. 6 is a second menu displayed by the input device for use by the vehicle operator in accordance with the one embodiment.

FIG. 5 shows one of many main menus a vehicle operator can select leading to further menus. Specifically, the electronic controller 40 causes a menu $M_1$ to be displayed such that the vehicle operator can select a sub-menu in order to enter data, change settings or select instructions to be carried out by the electronic controller 40. The vehicle operator operates the switch 52 to toggle the highlighting cursor (rectangular box) shown in FIG. 5 between possible selections. When the highlighting cursor surrounds the Vehicle Settings command, the vehicle operator can press the button 56, thereby causing the electronic controller 40 to display another menu. Specifically, as shown in FIG. 6, a menu $M_2$ is displayed. For the sake of simplicity only one command is shown in menu $M_2$, however it should be understood from the drawings and the description herein that other commands can be included in menu $M_2$. Again, using the button 56, the vehicle operator can select the Air Down Alert command thereby moving to further menus, such as the menu $M_3$ and the menu $M_4$ in FIGS. 7 and 8, respectively.

Figure 7:
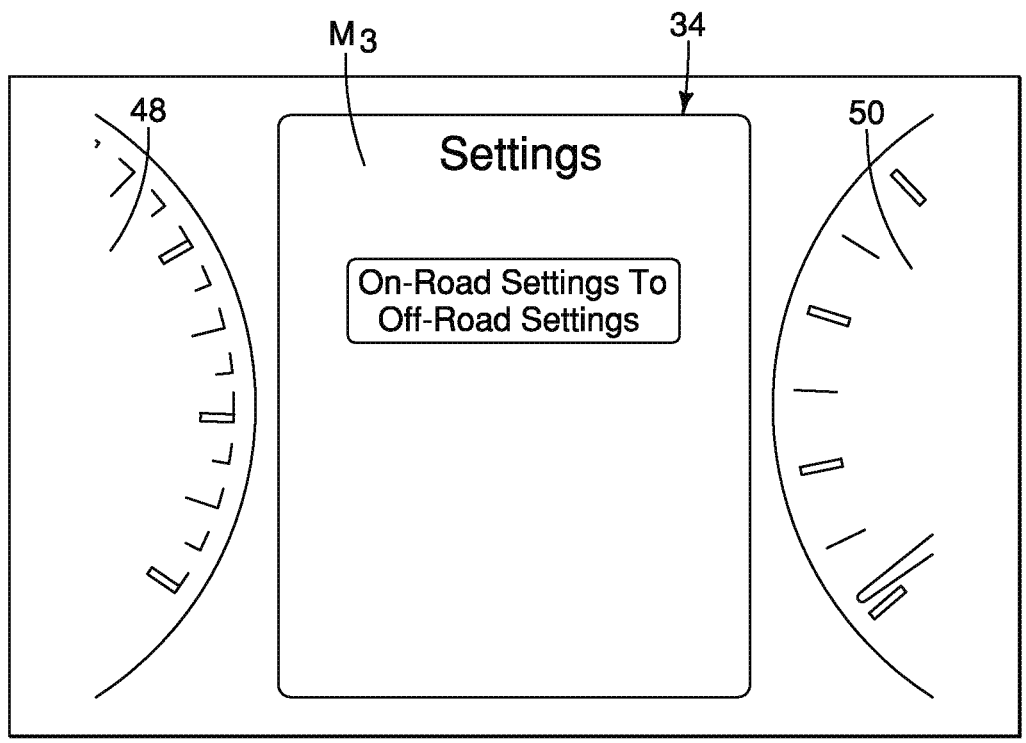
FIG. 7 is a third menu displayed by the input device for use by the vehicle operator in accordance with the one embodiment.

In FIG. 7, the depicted selection is an instruction for the electronic controller 40 to monitor the air pressure in each of the tires 16, 18, 20 and 22. Once the instruction depicted in menu $M_3$ is selected, for a predetermined period of time, for example 5 minutes, the electronic controller 40 continuously monitors the air pressure in the tires while an attendant, a vehicle operator or a passenger (hereinafter, the vehicle operator) outside the vehicle 10 manually lets air out of each of the tires, tire by tire (one by one), as shown in FIG. 2. It is assumed that the air pressure in the tires prior to selection of the instructions in menu $M_3$ is at the first preset tire pressure (for paved road driving conditions). During the predetermined period of time, the vehicle operator moves tire to tire and lets air out of each tire until that tire has its air pressure lowered to the second preset tire pressure (for off-road driving conditions). Once each wheel has achieved the desired pressure, the electronic controller 40 operates the altering device (one or both of the interior signaling device 36 and the exterior signaling device 38) provides a first alert or signal informing the vehicle operator that the appropriate tire pressure has been achieved.

Figure 8:
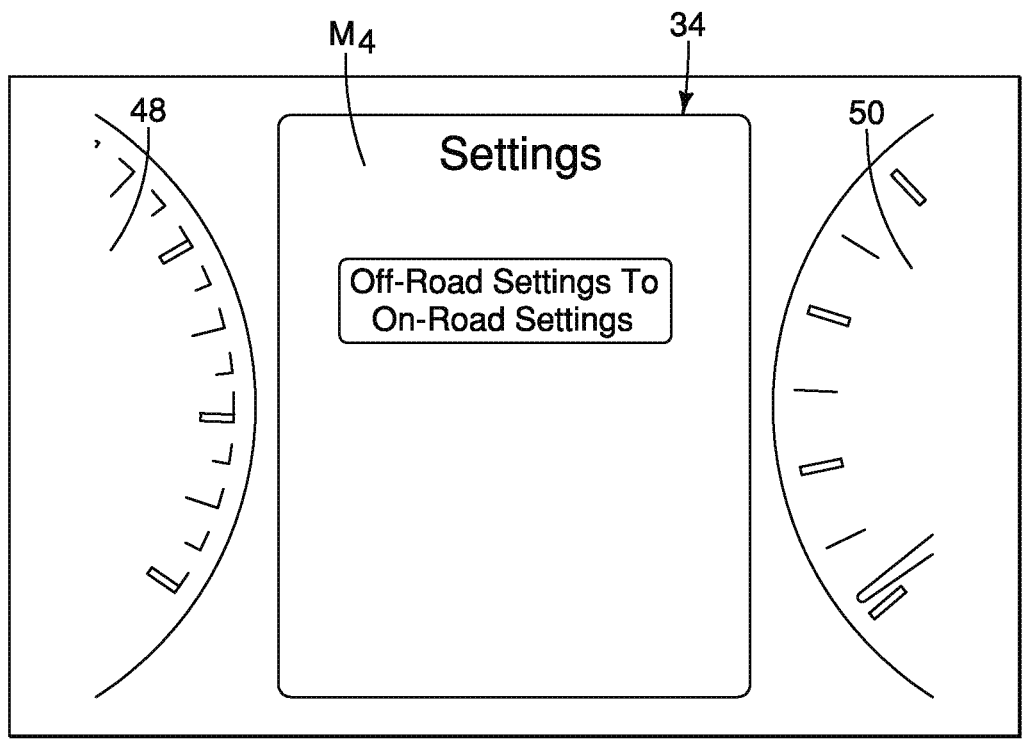
FIG. 8 is a fourth menu displayed by the input device for use by the vehicle operator in accordance with the one embodiment.

In FIG. 8, the depicted selection is an instruction for the electronic controller 40 to monitor the air pressure in each of the tires 16, 18, 20 and 22 again. Once the instruction depicted in menu $M_4$ is selected, for a predetermined period of time, for example 5 minutes, the electronic controller 40 continuously monitors the air pressure in the tires while the vehicle operator outside the vehicle 10 manually puts compressed air into each tire, tire by tire (one by one) as shown in FIG. 2. It is assumed that the air pressure in the tires prior to selection of the instructions in menu $M_4$ is at the second preset tire pressure (for off-road driving conditions). During the predetermined period of time, the vehicle operator moves tire to tire and puts compressed air into each tire until that tire has its air pressure raised to the first preset tire pressure (for paved road driving conditions). Once each wheel has achieved the desired pressure, the electronic controller 40 operates the altering device(one or both of the interior signaling device 36 and the exterior signaling device

38) provides the first alert or signal informing the vehicle operator that the appropriate tire pressure has been achieved.

The electronic controller 40 can be configured in any of a variety of ways. For example, since the electronic controller 40 can determine which tire is having its air pressure changes, the electronic controller 40 can provide a unique first alert or signal, with a different signal being provided for each tire. For example, the alerting device can be operated to emit a first signal upon achieving the desired air pressure for the tire 16, a second signal upon achieving the desired air pressure for the tire 18, a third signal for achieving the desired air pressure for the tire 30 and a fourth signal upon achieving the desired air pressure for the tire 22.

Alternatively, the same first signal can be emitted as each, one by one, of the four tires achieves the desired air pressure.

Figure 9:
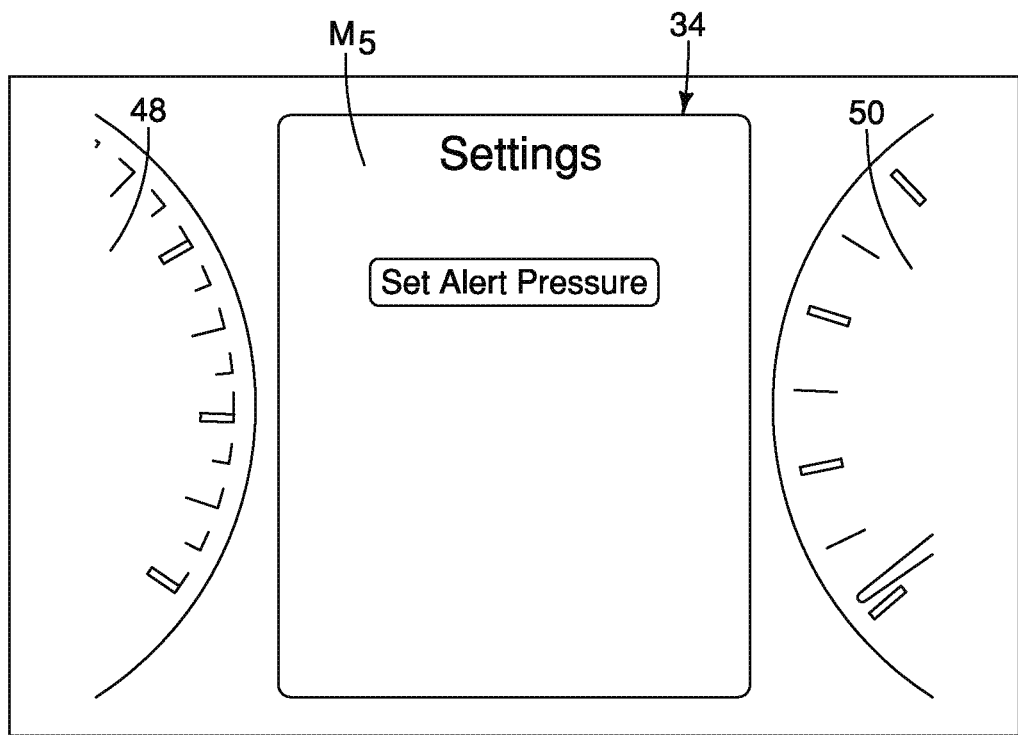
FIG. 9 is a fifth menu displayed by the input device for use by the vehicle operator in accordance with the one embodiment.

The electronic controller 40 is further configured to display menus displaying data that can be changes and/or adjusted to suit the decisions of the vehicle operator and the driving conditions anticipated by the vehicle operator. For example, as shown in FIG. 9, a menu $M_5$ can be displayed with several commands or instructions (only on instruction is depicted in FIG. 9) with one of those commands and instructions being linked to a further menu or menus where the vehicle operator can change, enter and save specific data to memory. As shown in FIG. 9, the air pressure (Set Alert Pressure) for one or both of the first and second preset tire pressures (on road and off-road driving conditions) can be entered or reset.

Figure 10:
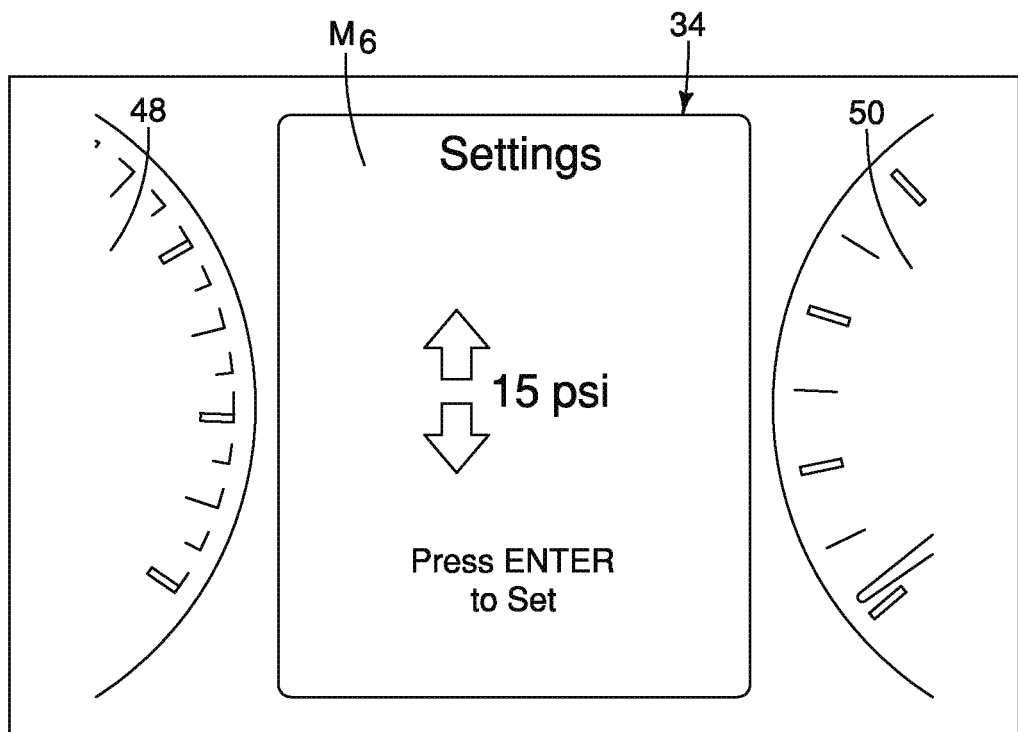
FIG. 10 is a sixth menu displayed by the input device for use by the vehicle operator in accordance with the one embodiment.
Figure 11:
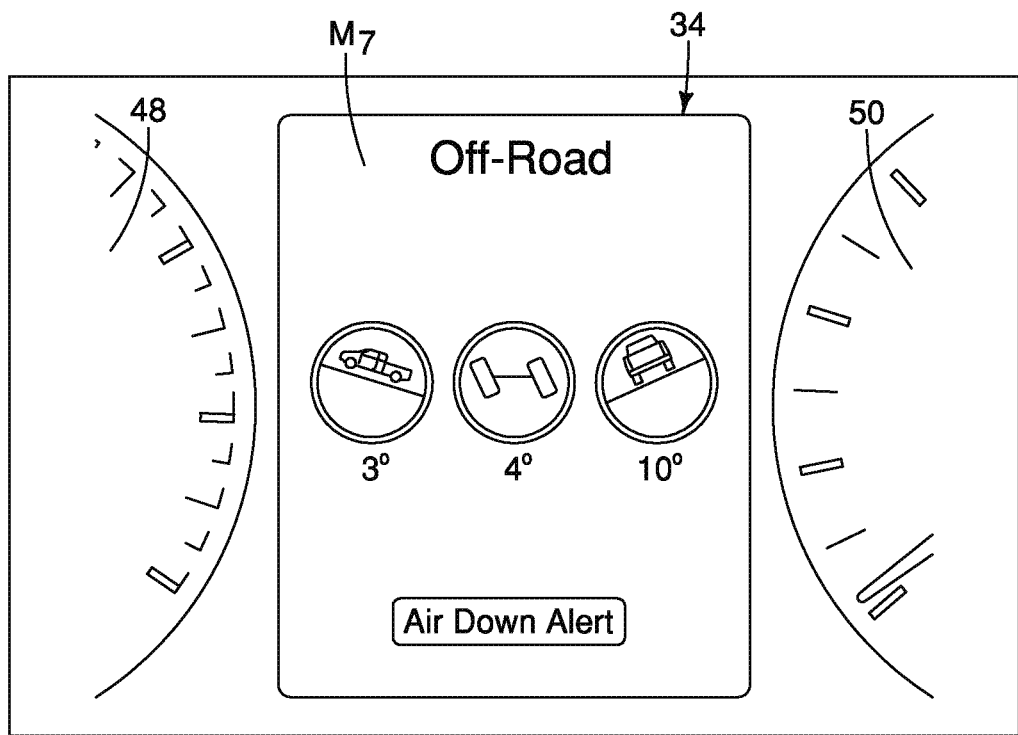
FIG. 11 is a seventh menu displayed by the input device for use by the vehicle operator in accordance with the one embodiment.

As shown in FIG. 10, a menu $M_6$ is displayed providing the vehicle operator to change the second preset tire pressure for off-road driving conditions. The vehicle operator can change the second present tire condition and save it to memory. As shown in FIG. 11, a menu $M_7$ is displayed, providing the vehicle operator with an opportunity specific conditions relating to off-road driving conditions. Specifically, if the vehicle operator anticipated driving on an inclined surface, that information can be entered, saved and subsequently used by the electronic controller 40 in a determining vehicle performance in such conditions when the tire air pressure is change from the first preset tire pressure to the second preset tire pressure. Such vehicle performance can include the electronic controller 40 slight changes in the operation of the ABS (anti-lock braking system) and/or traction related systems of the vehicle 10.

Figure 12:
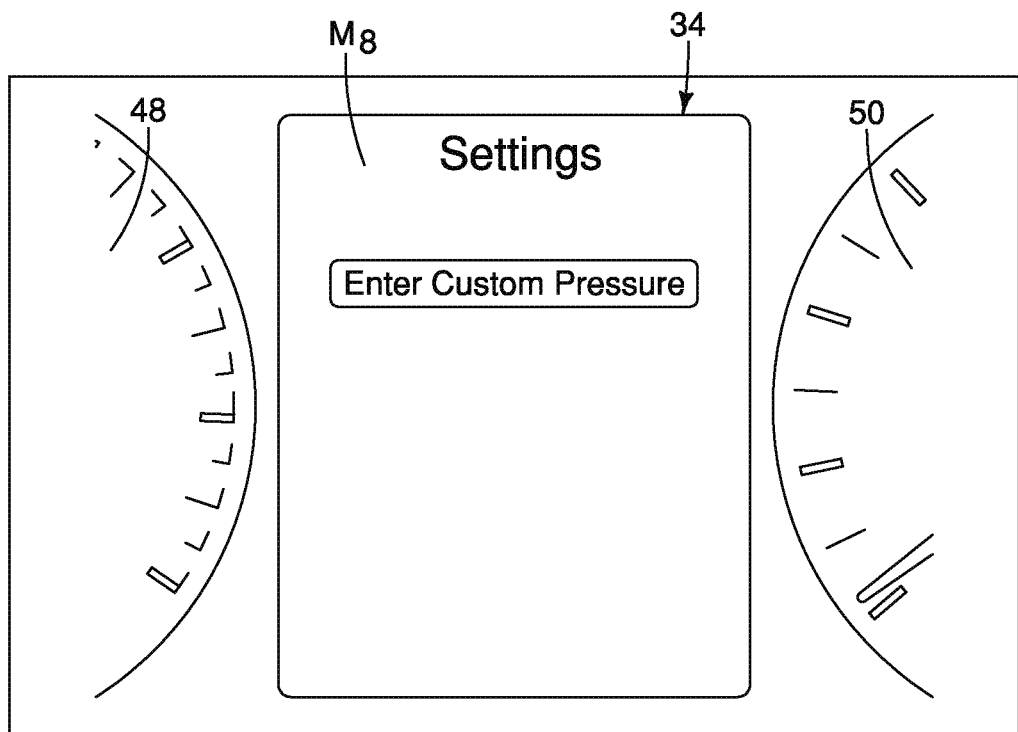
FIG. 12 is a eighth menu displayed by the input device for use by the vehicle operator in accordance with the one embodiment.
Figure 13:
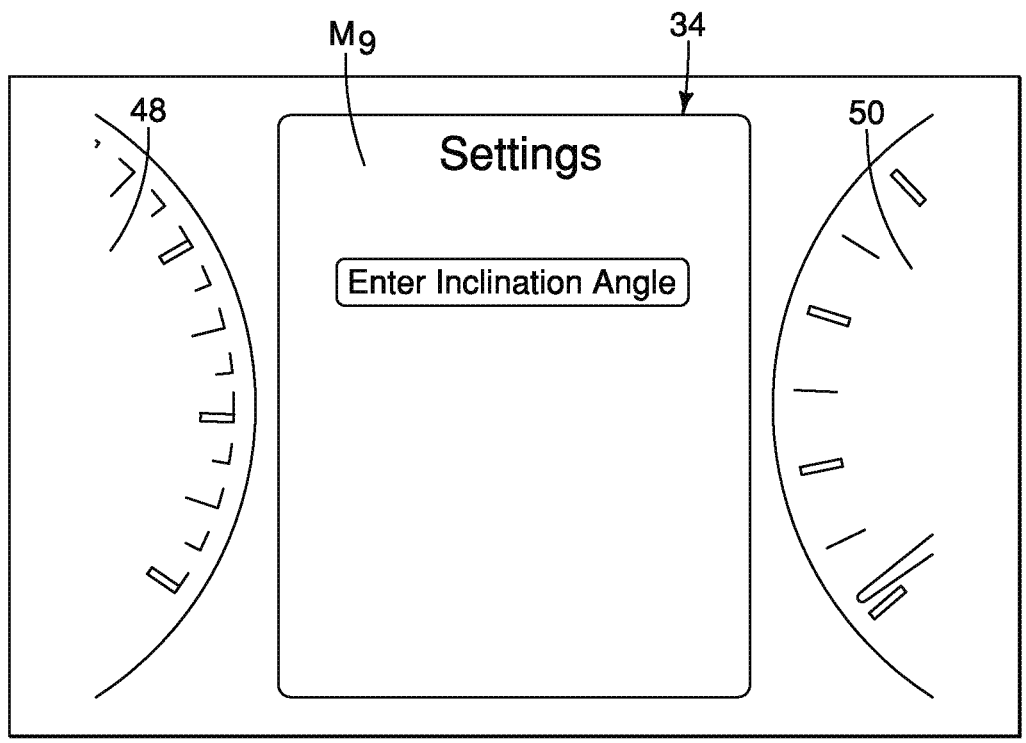
FIG. 13 is a ninth menu displayed by the input device for use by the vehicle operator in accordance with the one embodiment.
Figure 14:
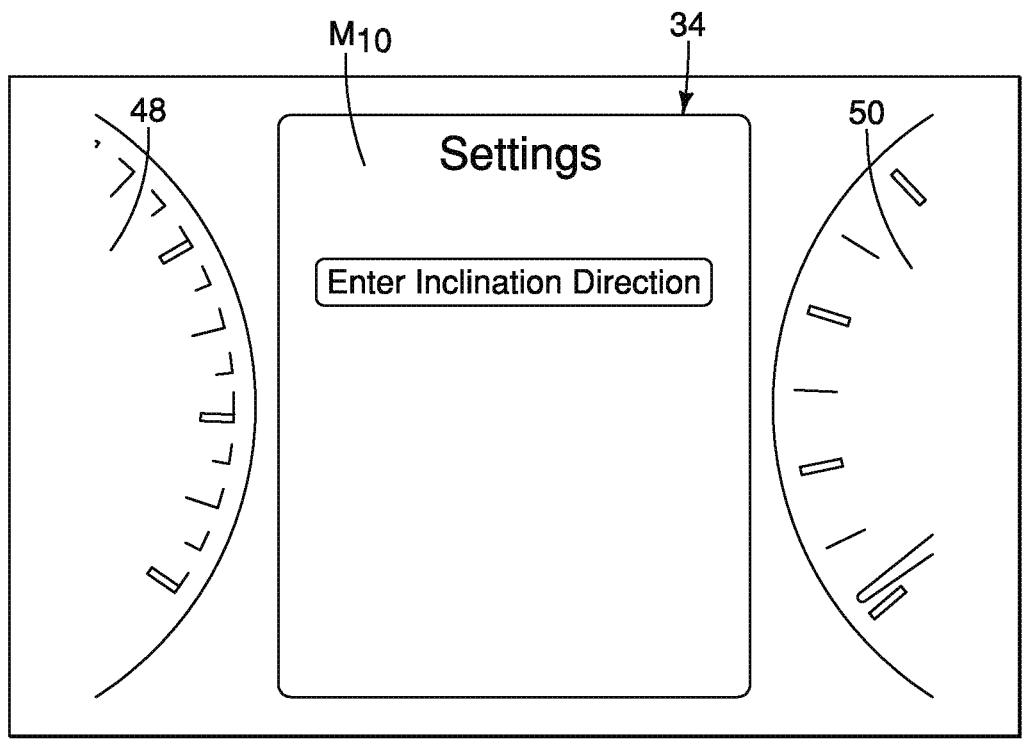
FIG. 14 is a tenth menu displayed by the input device for use by the vehicle operator in accordance with the one embodiment.
Figure 15:
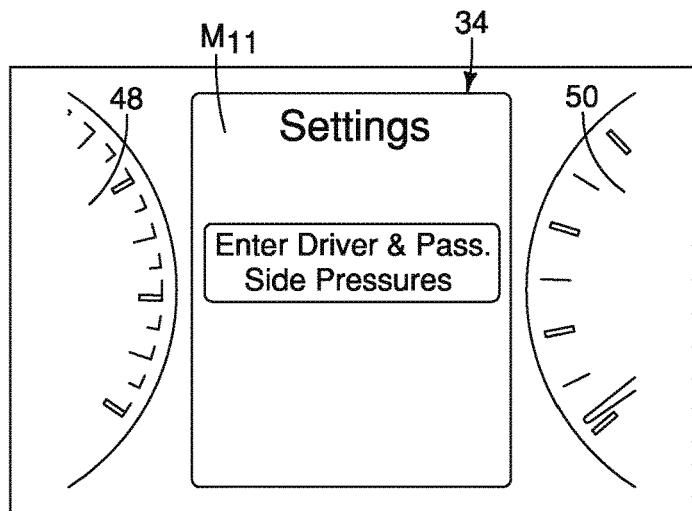
FIG. 15 is a eleventh menu displayed by the input device for use by the vehicle operator in accordance with the one embodiment.

In FIG. 12, another menu $M_8$ shows selection offering the vehicle operator an opportunity to customize second preset tire pressure settings even further. Upon selection of the option in menu $M_8$, the menu $M_9$ in FIG. 13 is displayed. The vehicle operator can enter the anticipated angle of inclination of an upcoming off-road drive. Next in FIG. 14, the menu $M_{10}$, the vehicle operator can enter the orientation of the vehicle 10 relative to the angle if inclination. For example, the anticipated off-road drive may involve driving up the incline or down the incline. Consequently, the angle of inclination is relative to a longitudinal direction of the vehicle 10. The vehicle operator would select Longitudinal from a subsequent menu (not shown). Alternatively, the anticipated off-road drive may involve driving perpendicular to the incline, along the inclined surface, where the vehicle itself is inclined relative to a lateral direction of the vehicle. In such a situation, the vehicle 10 is not necessarily going up or down the incline. Consequently, the angle of inclination is relative to a lateral direction of the vehicle 10. The vehicle operator would select Lateral from a subsequent menu (not shown).

In a situation where the vehicle 10 is to drive in a direction perpendicular to an inclined surface, the tires on a lower side of the vehicle will experience different stresses that the tires on the upper side of the vehicle. The menu $M_{11}$ in FIG. 10 provides the opportunity for the vehicle operator to customize the air pressure of the tires on the lower side of the vehicle 10 to be different from the air pressure on the higher side of the vehicle 10. For example, the vehicle operator may want the lower side tires to have a greater off-road pressure than the upper side tires. From $M_{11}$, the vehicle operator can enter such changes. More specifically, the electronic controller 40 is configured to operate the electronic input/output device 34 to receive selection of the off-road driving conditions that include a first lateral side tire pressure and a second lateral side tire pressure. When the vehicle operator chooses to change the tire air pressure from the first preset tire pressure to the second preset tire pressure, these offset tire pressures can be selected from memory.

The electronic controller 40 is also configured to enter and save further off-road driving condition data. Specifically, the electronic controller 40 can display further menus (not shown) that list more specific condition data for selection by the vehicle operators. Specifically, the electronic controller 40 receive selection and data input of off-road conditions, include one or more of following: a rocky conditions, gravel conditions, sand conditions, a river and water conditions, and mud conditions. Each of these conditions can require modifications to the electronic controller 40 to make slight changes in the operation of the ABS (anti-lock braking system) and/or traction related systems of the vehicle 10.

Figure 16:
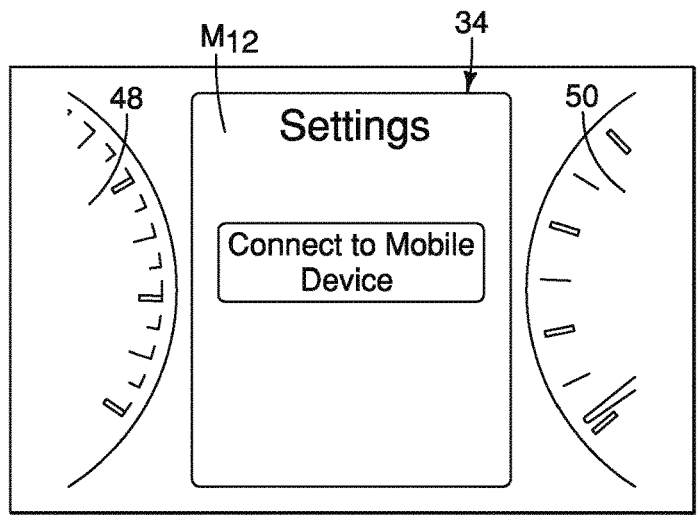
FIG. 16 is a twelfth menu displayed by the input device for use by the vehicle operator in accordance with the one embodiment.

As shown in FIG. 16, the menu $M_{12}$ provides an opportunity for the vehicle operator to link the vehicle 10 to a mobile device such as a cell phone or an electronic tablet. Optionally, the cell phone and/or the electronic tablet can be provided with an app (a computer program) that displays all (and more) of the menu features in FIGS. 5-17. Once the mobile device in linked to the electronic controller 40, the mobile device (shown in FIG. 3) can be the input device 34. As shown in FIG. 3, the mobile device can link to and communicate with the electronic controller 40 via the internet, WiFi or BlueTooth®.

Figure 17:
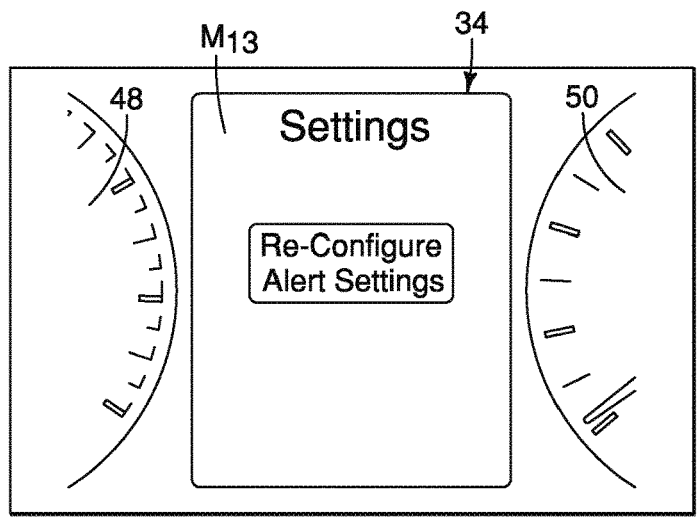
FIG. 17 is a thirteenth menu displayed by the input device for use by the vehicle operator in accordance with the one embodiment.

As shown in FIG. 17, the electronic controller 40 can further display a menu $M_{13}$ that allows the vehicle operator to change the operations of the alerting devices (the interior signaling device 36 and the exterior signaling device 38). Specifically, any one or combinations of various alerting devices can be selected for use by the electronic controller 40. The altering devise can include haptic devices, lighting or illumination devices, and audio devices. The vehicle operator can use menus (not shown) displayed on the input device 34 to select the alerting devices to provide one or more of a haptic alert from a haptic device, an illumination alert from a lighting device and an audio alert from an audio device. The haptic device can be any one of the following devices: a keyfob and a mobile device, such as a mobile phone. The lighting illumination or lighting device can be any one of the following devices installed to the vehicle body structure and/or electronically linked to the electronic controller 40: a turn signal lamp, headlamps, the display of a mobile device (such as a cell phone) and an LED (light emitting diode) on or within the vehicle 10. The audio device can be one or more of the following devices: a vehicle horn, an entertainment system within the vehicle, a mobile phone and an alarm device installed within the vehicle body structure 14.

The tire pressure monitoring system 12 can operate in any of a variety of manners, such as the following manner.

The electronic controller 40 can access from its electronic memory data that defines the first tire pressure and the second tire pressure for each of a plurality of wheels or tires 16, 18, 20 and 22. As mentioned above, the first tire pressure is for on-road driving conditions and the second tire pressure is for off-road driving conditions. The electronic controller 40 displays at least one menu via an electronic input/output device 34 (input device 34). A vehicle operator inputs data via the electronic input/output device 34, the inputted data includes at least one of data input, data selection and operation instructions. The data input can include supplemental tire pressure settings and off-road conditions. The data selection can further include selection from displayed menus including one of the first and second tire pressures, one of the supplemental tire pressure settings and one or more of the off-road conditions, and the instructions including requesting a change from one of the first tire pressure and the second tire pressure to the other the first tire pressure and the second tire pressure.

The electronic controller 40 is further configures to monitor tire pressure in each of the plurality of vehicle wheels (tires) and determine wheel-by-wheel whether or not the change in tire pressure in each of the plurality of wheels has been manually achieved by a person manually changing the tire pressure outside of the vehicle 10. The electronic controller 40 further operates the electronically controlled alerting device (the interior signaling device 36 and/or the exterior signaling device 38) to alert the person manually changing the tire pressure that the change in tire pressure has been achieved for each wheel, wheel by wheel.

Figure 18:
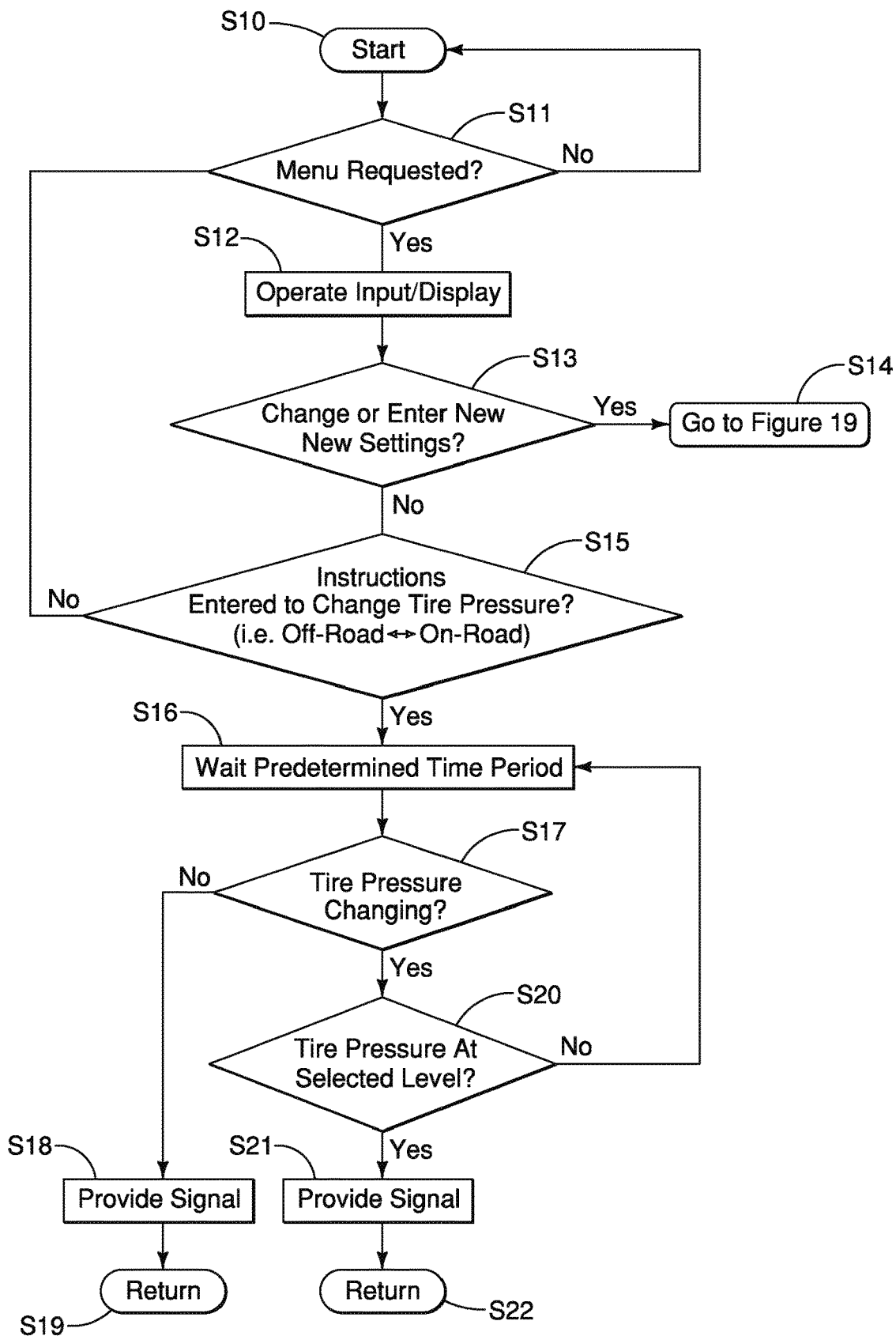
FIG. 18 is a first flowchart showing basic operations of the tire pressure monitoring system in accordance with the one embodiment.
Figure 19:
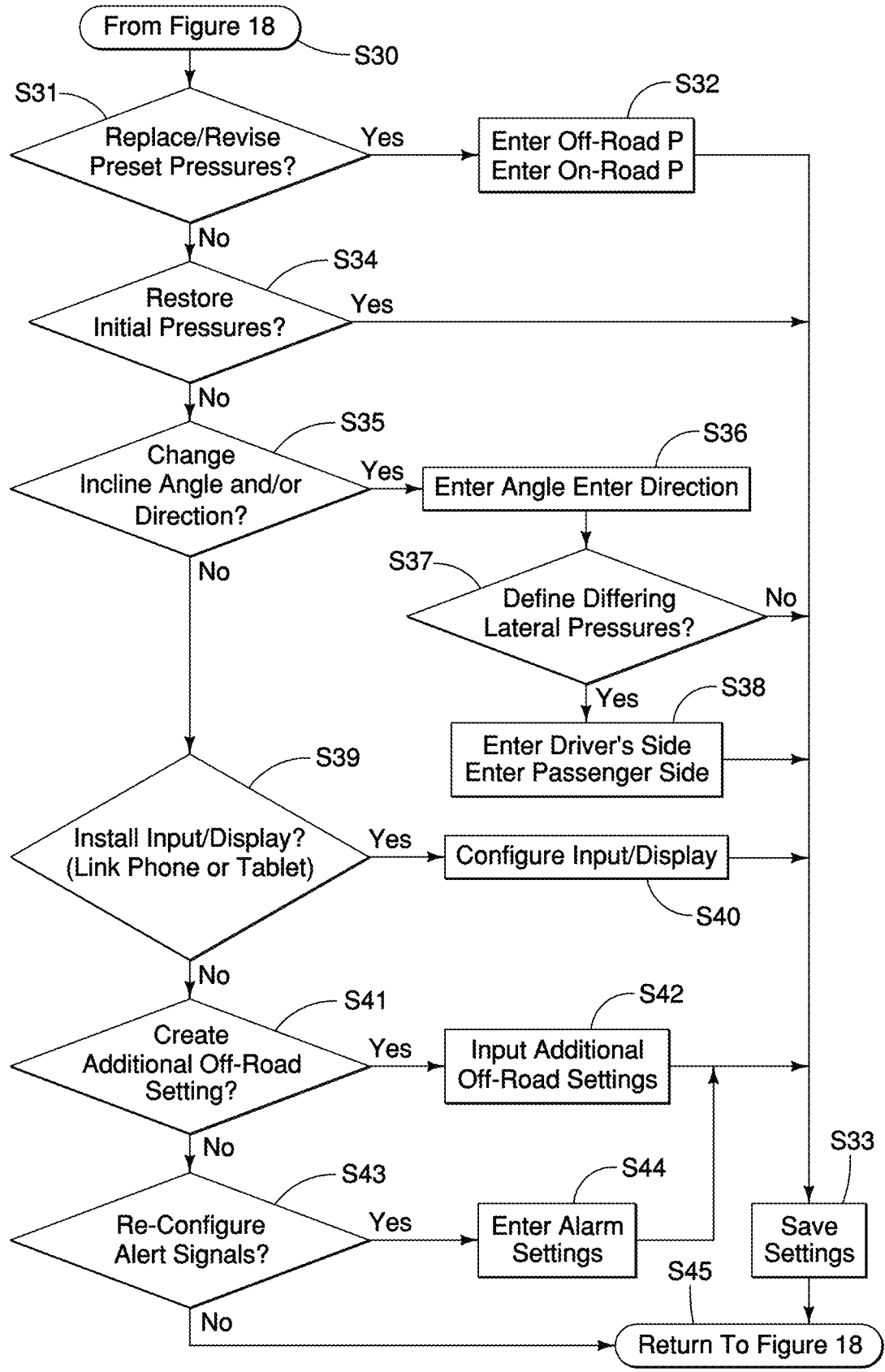
FIG. 19 is a second flowchart showing further basic operations of the tire pressure monitoring system in accordance with the one embodiment.

A description of one example of logic used by the electronic controller 40 is now provided with specific reference to the flowcharts shown in FIGS. 18 and 19.

In FIG. 18 at step S10, the tire pressure monitoring system 12 begins operating, for example, upon starting of the power plant E (engine E). The electronic controller 40 goes through a startup procedure checking communications with each of the devices and sensors in communication therewith or connected thereto. At step S11, the electronic controller 40 determines whether or not the vehicle operator has pressed the button 54, requesting display of menus via the input device 34. If no, then operation returns to step S10. If yes, operation moves to step S12.

At step S12, the electronic controller 40 operates the input device 34, and, in response to operation of the switches 52 and 54, and/or operation of the buttons 56 and 58, toggles between a plurality of menus, such as those depicted in FIGS. 5-17. At step S13 the electronic controller 40 determines whether or not one of the menus $M_1$-$M_{13}$ has been selected indicating that a change in electronically stored date (settings) is desired, or whether new settings are to be inputted. If yes, operation moves to step S14, where operations move to the flowchart in FIG. 17. If not, operation moves to step S15.

At step S15, the electronic controller 40 determines whether or not a switch between the first preset tire pressure (paved or on-road driving condition) and second preset tire pressure (off-road driving conditions). If the tire pressures of the tires are currently approximately at the first preset tire pressure, then the switch is a change to the second preset tire pressure. If the tire pressures of the tires are currently approximately at the second preset tire pressure, then the switch is a change to the first preset tire pressure. If no at step S15, then operation returns to step S11. If yes at step S15, then operation moves to step S16. At step S16, the electronic controller 40 begins continuously monitoring the air pressure at each of the four tires 16, 18, 20 and 22 for a predetermined period of time, such as, for example, five (5) minutes. During this time period, the vehicle operator is expected to either partially deflate each tire (if change is to the second preset tire pressure) or, add compressed air thereby inflating each tire (if change is to the first preset tire pressure).

At step S17, the electronic controller 40 determines whether or not any one of the tires is undergoing a change in tire pressure. If, during the predetermined period of time, there is no change in air pressure in any of the four tires, then the electronic controller 40 times out and moves to step S18. At step S18, the electronic controller 40 operates one or more of the alerting devices 36 and 38, alerting the vehicle operator that no action has been undertaken and that the system has timed out. Operation moves to step S19, where operations return back to step S10.

If, at step S17, the electronic controller 40 determines that the air pressure is changing in one of the tires, the electronic controller 40 continues to monitor the air pressure within that tire. At step S20, the electronic controller 40 determines whether or not the air pressure in the tire has been changed to the desired air pressure. If yes, at step S21, the electronic controller 40 operates one or more of the alerting devices 36 and 38, alerting e vehicle operator that the desired tire pressure has been achieved. Although not shown in FIG. 18, the electronic controller 40 repeats this process for each of the four tires until all four tires have been manually inflated or deflated to achieve the desired tire air pressure. Thereafter, operation moves to step S22, and returns to step S10.

From step S14 in FIG. 18, operation moves to step S30 in FIG. 19. At step S31, the electronic controller 40 determines whether or not a menu has been selected that replaces or revises one or both of the first and second present tire pressures, or other off-road settings. At step S31, if yes, then operation moves to step S32, where the on-road tire pressure and/or the off-road tire pressure can be revised. Thereafter, operation move to step S33 where the new settings are saved for future use.

At step S31, if no, then operation moves to step S34.

At step S34, the electronic controller 40 determines whether or not the vehicle operator has sent instructions to restore the first and second preset tire pressures to their original factory settings (if the vehicle operator previously changed the pressures). At step S34, if yes, then the original initial factory settings are restored, operation move to step S33 where the restored settings are saved for future use.

At step S34, if no, then operation moves to step S35.

At step S35, the electronic controller 40 determines whether or not the vehicle operator has sent instructions to enter an angle of inclination and a vehicle orientation or direction relative to the angle of inclination. If yes, operation moves to step S36 where the angle and vehicle direction relative to the angle of inclination are entered by the vehicle operator. This operation is represented in FIGS. 11-14. Next at step S37, the electronic controller 40 determines whether or not the vehicle operator has chosen to enter differing lateral air pressures (one value for the passenger' side tires and a different value for the driver's side tires of the vehicle 10). If no, operation moves to step S33 where settings are saved. If, at step S37, data is to be entered, operation moves to step S38 (FIG. 15) where the vehicle operator can enter the air pressure for tires on the driver's side, and air pressure settings for the passenger's side tires. Thereafter, operation moves to step S33 where the data and settings are saved in electronic memory.

At step S35, if no, then operation moves to step S39. At step S39, the electronic controller 40 determines whether or not the vehicle operator has selected a request to link to an additional input device 34, such as a mobile device (a mobile phone or tablet). If yes, then operation moves to step S40 where the mobile device is linked to the electronic controller 40. Thereafter, operation moves to step S33 where the data and settings are saved in electronic memory.

At step S39, if no, operation moves to step S41. At step S41 the electronic controller 40 determines whether or not the vehicle operator has selected instructions to create an additional off-road setting for conditions that differ from the default settings or revised first and second present tire pressures. If yes, at step S42, the vehicle operator enters the additional off-road settings. At step S33, where the entered settings are saved.

At step S41, if no, then operation moves to step S43. At step S43, the electronic controller 40 determines whether or not the vehicle operator has selected instructions to re-configure the alert signals set forth by the alerting devices 36 and 38. For example, the vehicle operator may select have the vehicle horn provide the alerts, or have a chime, buzzer or bell emit noise from within the vehicle, have the lights flash as the alert signal, or have the vehicle keyfob or cell phone vibrate. If yes, at step S44 the vehicle operator can make such changes using the input device 34, as with all the above described data entry choices. Once completed, operation moves to step S33 where the entered settings are saved. Thereafter, operation moves to step S45, where the electronic controller 40 returns to the flow chart in FIG. 18.

At step S43, if no further data entry is to be entered, operation moves to step S45.

One advantage of the above described system is that it can make use of some of the existing components of conventional tire pressure monitoring systems (TPMS). These conventional elements can ben re-programmed and re-configured to provide additional features, operations and benefits not found in previous systems.

The ability to use the tire pressure monitoring system 12 for adjusting the tire pressure in the tires to go from on-road driving conditions to off-road driving conditions and back again, is of great benefit to off-road driving enthusiasts. In the above system, the vehicle operator inflates and deflates the tires as required, without the need of a tire gauge since an alert or signal is provided informing him/her that the desired tire pressure has been achieved.

Further, the above described system is configured to have the vehicle operator enter specific data preferred by the vehicle operator to reflect anticipated off-road conditions.

The various vehicle features and components (other than the tire pressure monitoring system 12) are conventional components that are well known in the art. Since such conventional vehicle features and components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the tire pressure monitoring system. Accordingly, these terms, as utilized to describe the present invention should be interpreted relative to a vehicle equipped with the tire pressure monitoring system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A tire pressure monitoring system comprising:
a vehicle body structure;
a plurality of wheels rotatably mounted to the vehicle body structure, each of the plurality of wheels having a tire pressure sensor installed therein;
a receiver configured to receive tire pressure signals from each of the tire pressure sensors;
an alerting device;
an electronic input/output device configured to receive manually input instructions; and
an electronic controller having electronic memory and being electronically connected to the receiver, the alerting device and the electronic input/output device, the electronic input/output device being configured for vehicle operator input of a first preset tire pressure and a second preset tire pressure for each of the plurality of wheels being stored in the electronic memory, the first preset tire pressure being for paved road driving conditions and the second preset tire pressure being for off-road driving conditions, the electronic controller storing in the electronic memory the vehicle operator input of the first preset tire pressure and the second preset tire pressure, in response to the vehicle operator inputting to the electronic controller a change from on-road driving to off-road driving the electronic controller is configured to monitor tire pressure for a first predetermined period of time while a person manually releases air one-by-one from each of the plurality of wheels, in response to determining one-by-one that the change in tire pressure in each of the plurality of wheels from the first preset tire pressure to the second preset tire pressure has been achieved the electronic controller for each of the plurality of wheels operates the alerting device to alert the person manually changing the tire pressure that the change to the second preset tire pressure has been achieved and the vehicle is now ready for off-road driving, and in response to determining that the first predetermined period of time has expired without any change in tire pressure in the plurality of wheels the electronic controller is configured to alert that the first predetermined period of time has timed out, and in response to the vehicle operator inputting to the electronic controller a change from off-road driving to on-road driving the electronic controller is further configured to monitor tire pressure for a second predetermined period of time while a person one-by-one adds air into each of the plurality of wheels, in response to determining one-by-one that the change in tire pressure in each of the plurality of wheels from the second preset tire pressure to the first preset tire pressure has been achieved the electronic controller for each of the plurality of wheels operates the alerting device to alert the person manually changing the tire pressure that the change in tire pressure to the first preset tire pressure has been achieved and the vehicle is now ready for on-road driving, and in response to determining that the second predetermined period of time has expired without any change in tire pressure in the plurality of wheels the electronic controller is configured to alert that the second predetermined period of time has timed out.

2. The tire pressure monitoring system according to claim 1, wherein
the alerting device includes one or more of the following types of devices: a haptic device, a lighting device, and an audio device.

3. The tire pressure monitoring system according to claim 2, wherein
the alerting device includes the haptic device, and
the haptic device is any one of the following devices: a keyfob and a mobile phone.

4. The tire pressure monitoring system according to claim 2, wherein
the alerting device includes the lighting device, and
the lighting device is any one of the following devices installed to the vehicle body structure or electronically linked to the electronic controller: a turn signal lamp, a headlamp, a mobile phone, and an LED (light emitting diode).

5. The tire pressure monitoring system according to claim 2, wherein
the alerting device includes the audio device, and
the audio device is one or more of the following devices: a vehicle horn, an entertainment system within the vehicle body structure, a mobile phone, and an alarm device installed within the vehicle body structure.

6. The tire pressure monitoring system according to claim 1, wherein
the electronic input/output device includes any one of the following devices: a touch screen display within the vehicle body structure, a control panel within the vehicle body structure, and a mobile phone with an app configured to electronically communicate with the electronic controller.

7. The tire pressure monitoring system according to claim 1, wherein
the electronic controller is further configured such that:
the alerting device is operated to provide a first alert signal in response to a first wheel of the plurality of wheels manually achieving the change in tire pressure;
the alerting device is operated to provide a second alert signal in response to a second wheel of the plurality of wheels manually achieving the change in tire pressure;
the alerting device is operated to provide a third alert signal in response to a third wheel of the plurality of wheels manually achieving the change in tire pressure; and
the alerting device is operated to provide a fourth alert signal in response to a fourth wheel of the plurality of wheels manually achieving the change in tire pressure.

8. The tire pressure monitoring system according to claim 1, wherein
the electronic controller is further configured such that:
the alerting device is operated to provide an alert signal in response to a first wheel of the plurality of wheels manually achieving the change in tire pressure;
the alerting device is operated to provide the alert signal in response to a second wheel of the plurality of wheels manually achieving the change in tire pressure;
the alerting device is operated to provide the alert signal in response to a third wheel of the plurality of wheels manually achieving the change in tire pressure; and
the alerting device is operated to provide the alert signal in response to a fourth wheel of the plurality of wheels manually achieving the change in tire pressure.

9. The tire pressure monitoring system according to claim 1, wherein
the electronic controller is configured to adjust the first preset tire pressure or the second preset tire pressure for at least one of the wheels based on an angle of inclination of the vehicle.

10. The tire pressure monitoring system according to claim 1, wherein
the electronic controller is configured to adjust the first preset tire pressure or the second preset tire pressure for at least one of the wheels based on a vehicle orientation or direction.

11. The tire pressure monitoring system according to claim 1, wherein
the electronic controller is configured to adjust the first preset tire pressure or the second preset tire pressure to be different for at least one wheel compared to at least one other wheel based on at least one of: (i) an angle of inclination of the vehicle, and (ii) a vehicle orientation or direction.

12. The tire pressure monitoring system according to claim 1, wherein
the first predetermined period of time is the same as the second predetermined period of time.

13. A method for operation of an electronic controller of a tire pressure monitoring system for a vehicle, comprising:

defining and saving inputted data by a vehicle operator in electronic memory a first preset tire pressure and a second preset tire pressure, where the first preset tire pressure is for driving with paved road driving conditions and the second preset tire pressure is for driving with off-road driving conditions;

inputting by a vehicle operator via an electronic input/output device connected to the electronic controller a request for off-road driving in order to change tire pressure in each of a plurality of wheels from the first preset tire pressure to the second preset tire pressure, the first preset tire pressure corresponding to paved road driving conditions and the second preset tire pressure corresponding to off-road driving conditions;

monitoring one-by-one tire pressure within each of the plurality of wheels of the vehicle for a first predetermined period of time while a person one-by-one manually changes the tire pressure of each of the plurality of wheels from the first preset tire pressure to the second preset tire pressure until the vehicle is ready for off-road driving;

operating an electronically controlled alerting device to alert the person manually changing the tire pressure one wheel at a time that the change in tire pressure to the second preset tire pressure in each wheel has been achieved such that the vehicle is ready for off-road driving, and in response to determining that the first predetermined period of time has expired without any change in tire pressure in the plurality of wheels to alert that the first predetermined period of time has timed out;

inputting by the vehicle operator via an electronic input/output device connected to the electronic controller a request for paved road driving in order to change tire pressure in each of the plurality of wheels from the second preset tire pressure to the first preset tire pressure in preparation for paved road driving;

monitoring one-by-one tire pressure within each of the plurality of wheels of the vehicle for a second predetermined period of time while the person one-by-one manually changes the tire pressure of each of the plurality of wheels from the second preset tire pressure to the first preset tire pressure until the vehicle is ready for paved road driving; and operating the electronically controlled alerting device to alert the person manually changing the tire pressure one wheel at a time that the change to the first preset tire pressure in each wheel has been achieved such that the vehicle is ready for paved road driving, and in response to determining that the second predetermined period of time has expired without any change in tire pressure in the plurality of wheels to alert that the second predetermined period of time has timed out.

14. The method for operation of the electronic controller of the tire pressure monitoring system according to claim 13, wherein
the operating of the electronically controlled alerting device includes at least one of the following: a haptic alert from a haptic device, an illumination alert from an illumination device device, and an audio alert from an audio device.

15. The method for operation of the electronic controller of the tire pressure monitoring system according to claim 14, wherein
the operating of the electronically controlled alerting device includes the haptic alert from the haptic device, and
the haptic alert is produced by any one of the following haptic devices: a keyfob and a mobile phone.

16. The method for operation of the electronic controller of the tire pressure monitoring system according to claim 14, wherein
the operating of the electronically controlled alerting device includes the illumination alert from the illumination device, and
the illumination alert is produced by any one of the following illumination devices: a turn signal lamp, a headlamp, a mobile phone, and an LED (light emitting diode).

17. The method for operation of the electronic controller of the tire pressure monitoring system according to claim 14, wherein
the operating of the electronically controlled alerting device includes the audio alert from the audio device, and
the audio alert is produced by any one of the following audio devices: a vehicle horn, an entertainment system within a vehicle body structure, a mobile phone, and an alarm device.

18. The method for operation of the electronic controller of the tire pressure monitoring system according to claim 13, wherein
the inputting via the electronic input/output device includes the electronic input/output device being any one of the following devices: a touch screen display, a control panel, and a mobile phone with an app configured to electronically communicate with the electronic controller.

19. The method for operation of the electronic controller of the tire pressure monitoring system according to claim 13, wherein
the operating of the electronically controlled alerting device to alert the person manually changing the tire pressure includes
operating the alerting device to provide a first alert signal in response to a first wheel of the plurality of wheels manually achieving the change in tire pressure;
operating the alerting device to provide a second alert signal in response to a second wheel of the plurality of wheels manually achieving the change in tire pressure;
operating the alerting device to provide a third alert signal in response to a third wheel of the plurality of wheels manually achieving the change in tire pressure; and
operating the alerting device to provide a fourth alert signal in response to a fourth wheel of the plurality of wheels manually achieving the change in tire pressure.

20. The method for operation of the electronic controller of the tire pressure monitoring system according to claim 13, wherein
the operating of the electronically controlled alerting device to alert the person manually changing the tire pressure includes
operating the alerting device to provide an alert signal in response to a first wheel of the plurality of wheels manually achieving the change in tire pressure;
operating the alerting device to provide the alert signal in response to a second wheel of the plurality of wheels manually achieving the change in tire pressure;
operating the alerting device to provide the alert signal in response to a third wheel of the plurality of wheels manually achieving the change in tire pressure; and operating the alerting device to provide the alert signal in response to a fourth wheel of the plurality of wheels manually achieving the change in tire pressure.

\* \* \* \* \*